United States Patent
Chiaverini et al.

(10) Patent No.: US 11,388,563 B2
(45) Date of Patent: Jul. 12, 2022

(54) SYSTEM AND METHOD FOR DETERMINING DATA USAGE IN A CONVERGED CHARGING SYSTEM

(71) Applicant: Verizon Patent and Licensing Inc., Basking Ridge, NJ (US)

(72) Inventors: Marc Chiaverini, Randolph, NJ (US); James Mathison, Warren, NJ (US); Lixia Yan, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 165 days.

(21) Appl. No.: 16/989,093

(22) Filed: Aug. 10, 2020

(65) Prior Publication Data
US 2022/0046396 A1 Feb. 10, 2022

(51) Int. Cl.
*H04W 4/00* (2018.01)
*H04W 4/24* (2018.01)
*H04L 12/14* (2006.01)
*H04M 15/00* (2006.01)

(52) U.S. Cl.
CPC ........... *H04W 4/24* (2013.01); *H04L 12/1407* (2013.01); *H04M 15/58* (2013.01); *H04M 15/66* (2013.01); *H04M 15/80* (2013.01)

(58) Field of Classification Search
CPC ..... H04W 4/24; H04L 12/1407; H04M 15/58; H04M 15/66; H04M 15/80
See application file for complete search history.

(56) References Cited

U.S. PATENT DOCUMENTS

| 11,272,333 | B2* | 3/2022 | Chai | H04M 15/66 |
| 2011/0281551 | A1* | 11/2011 | Gonzalez | H04M 15/75 |
| | | | | 455/406 |
| 2012/0108200 | A1* | 5/2012 | Rubin | H04W 28/02 |
| | | | | 455/509 |
| 2012/0231781 | A1* | 9/2012 | Kumar | H04M 15/41 |
| | | | | 455/422.1 |
| 2013/0262308 | A1* | 10/2013 | Cai | G06Q 20/28 |
| | | | | 705/44 |
| 2017/0208505 | A1* | 7/2017 | Cheuk | H04L 43/16 |

FOREIGN PATENT DOCUMENTS

WO WO-2008110123 A1 * 9/2008 ............. G06Q 30/04

* cited by examiner

*Primary Examiner* — Khai M Nguyen

(57) ABSTRACT

Systems and methods described herein include receiving, at a network device and from a session management device, a first message that includes a first identifier associated with a subscriber and a second identifier associated with a first service that is charged using an online charging system. The network device transmits a second message that indicates a first time period in which to report data usage associated with the first service and a second time period in which to report data usage associated with one or more second services that are charged using an offline charging system. The network device receives first data usage information associated with the first service after the first time period and second data usage information associated with the one or more second services after the second time period. The network device processes the data usage information.

20 Claims, 6 Drawing Sheets

SYSTEM AND METHOD FOR DETERMINING DATA USAGE IN A CONVERGED CHARGING SYSTEM

BACKGROUND

Currently, there are a number of types of mechanisms for charging or billing wireless customers for data usage. An offline charging mechanism does not provide for real-time monitoring of data usage and customers may be billed after services are rendered. An online charging mechanism monitors data usage in real time and provides services based on the monitoring. A converged charging mechanism combines aspects of the offline mechanism and the online mechanism.

DETAILED DESCRIPTION OF THE PREFERRED EMBODIMENTS

Figure 1:
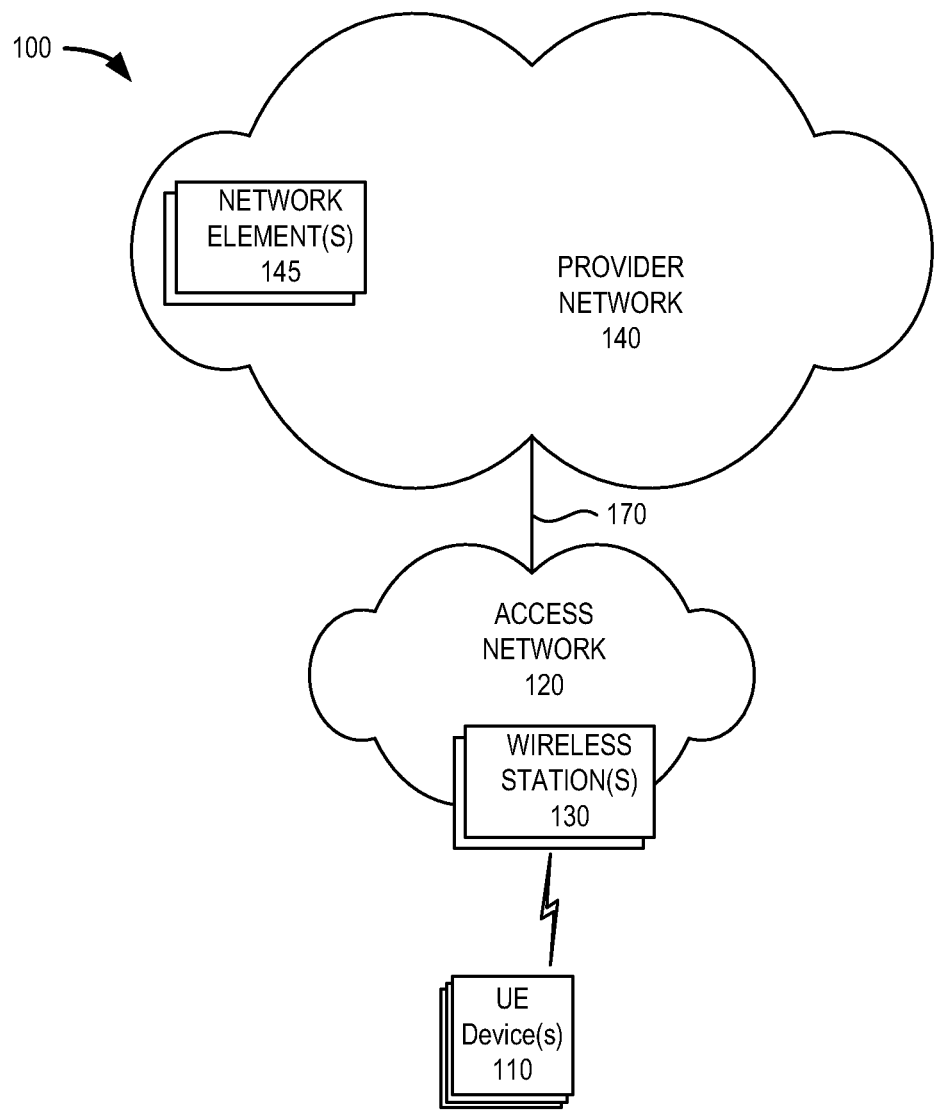
FIG. 1 is a diagram illustrating a network environment according to an implementation described herein.

The following detailed description refers to the accompanying drawings. The same reference numbers in different drawings may identify the same or similar elements. Also, the following detailed description does not limit the invention.

In an offline charging system, offline charging information may be collected and processed prior to delivery to a billing domain. Therefore, if a customer is utilizing a service that is charged offline, the service will not be monitored for data usage while the service is being rendered. After the user has completed using the service, information associated with the usage (e.g., data consumed while using the service, time spent using the service, etc.) may be collected and processed and sent to a billing domain for reconciliation and billing the customer.

An online charging system may perform real-time credit control. The functionality of the online charging system may include transaction handling, rating, online correlation, management of subscriber accounts and/or balances, and additional functions. If a customer is utilizing a service that is charged online, the service will be monitored for data usage while the service is being rendered. For example, if the customer's data usage while using the service rises above a particular threshold (e.g., a monthly data allotment threshold, a daily data allotment threshold, etc.), the customer's data usage may be turned off or the customer's data service may be slowed down. Since the services provided by an online charging service are being monitored for billing/charging, a direct interaction between a charging mechanism and a bearer/session/service control may be required.

Converged charging is a process in which online and offline charging are combined. With a converged charging system in a Fifth Generation (5G) network, a single system and a single interface may be able to support both the offline charging mechanism and the online charging mechanism. Currently, the converged charging system (CCS) is able to control when data usage information is reported to the CCS when a user is utilizing services associated with online charging systems. However, the CCS may not be able to control when the data usage is reported to the CCS when the user is utilizing services associated with offline charging systems.

Systems and methods described herein provide a mechanism for the CCS to control when user data associated with offline services is reported to the CCS. Implementations described herein may provide for new triggers to be introduced into the converged charging interface. One trigger may indicate how frequently the data associated with the offline services are to be reported to the CCS. Another trigger may indicate a time at which data associated with the offline services should no longer be counted for a billing cycle and should begin to be counted for a new billing cycle.

Systems and method described herein may allow the CCS to control when user data associated with the offline services is reported to the CCS by passing the new triggers to a session management device. In one implementation, the CCS may pass a trigger to the session management device indicating a time at which user data associated with offline services is to be reported to the CCS. The session management device may receive the trigger and may report data usage for offline services to the CCS at the time indicated in the trigger.

In another implementation, if a current time is within a predetermined time period from a start of a new billing cycle, the CCS may additionally pass a trigger to the session management device indicating the time of the start of the new billing cycle. In this implementation, when the session management device reports data usage for offline services to the CCS, the session management device may divide the data usage into data usage that occurred in the old billing cycle and data usage that occurred in the new billing cycle.

FIG. 1 is a diagram illustrating concepts described herein. As shown in FIG. 1, an environment 100 may include one or more user equipment (UE) devices 110 (referred to herein collectively as UEs 110 or individually as UE 110), an access network 120, one or more wireless stations 130, and a provider network 140.

UE 110 may include a wireless Machine-Type-Communication (MTC) device that communicates wirelessly with other devices over a machine-to-machine (M2M) interface; a handheld wireless communication device; a wearable computer device (e.g., a head-mounted display computer device, a head-mounted camera device, a wristwatch computer device, etc.); a global positioning system (GPS) device; a media playing device; a portable gaming system; a laptop, tablet, or another type of portable computer; a smartphone; and/or any other type of computer device with wireless communication capabilities. UE 110 may be used for voice communication, mobile broadband services (e.g., video streaming, real-time gaming, premium Internet access etc.), best-effort data traffic, and/or other types of applications.

According to exemplary implementations described herein, UE 110 may be configured to use one or more applications or services that use offline or online charging services. For example, UE 110 may access an offline application or service that provides data regarding user usage to a billing domain after the user has stopped using the application or service. As another example, UE 110 may access an online application or service that provides real-time information regarding user usage.

Access network 120 may provide access to provider network 140 for wireless devices, such as UE 110. Access network 120 may enable UE 110 to connect to provider network 140 for Internet access, non-Internet Protocol (IP) data delivery, cloud computing, mobile telephone service, Short Message Service (SMS) message service, Multimedia Message Service (MMS) message service, and/or other types of data services. Access network 120 may include wireless stations 130, and UE 110 may wirelessly communicate with access network 120 via wireless station 130. Access network 120 may establish a packet data network connection between UE 110 and provider network 140 via one or more Access Point Names (APNs). For example, wireless access network 120 may establish an Internet Protocol (IP) connection between UE 110 and provider network 140. In another implementation, access network 120 may provide access to a service or application layer network, a cloud network, a multi-access edge computing (MEC) network, a fog network, and so forth. Furthermore, access network 120 may enable a server device to exchange data with UE 110 using a non-IP data delivery method such as Data over Non-Access Stratum (DoNAS).

Access network 120 may include a 5G access network or another advanced network, such as a Fourth Generation (4g) LTE network. Additionally access network 120 may include functionality such as a mm-wave Radio Access Network (RAN); advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); carrier aggregation; relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of 5G functionality.

Wireless station 130 may include a gNodeB base station device and/or an eNodeB base station device that includes one or more devices (e.g., wireless transceivers) and other components and functionality that allow UE 110 to wirelessly connect to access network 120. Wireless station 130 may correspond to a macrocell or to a small cell (e.g., a femtocell, a picocell, a microcell, etc.). In other implementations, wireless station 130 may include another type of base station for another type of wireless network. Wireless stations 130 may connect to provider network 140 via backhaul links 170.

Provider network 140 may include a local area network (LAN), a wide area network (WAN), a metropolitan area network (MAN), an optical network, a cable television network, a satellite network, a wireless network (e.g., a code-division multiple access (CDMA) network, a general packet radio service (GPRS) network, and/or a long-term evolution (LTE) network), an ad hoc network, a telephone network (e.g., the Public Switched Telephone Network (PSTN) or a cellular network), an intranet, or a combination of networks. In one implementation, provider network 140 may allow the delivery of Internet Protocol (IP) services to UE 110, and may interface with other external networks, such as private IP networks.

According to one implementation, provider network 140 may include a core network for one or multiple access networks 120. For example, provider network 140 may include the core part of a 5G New Radio network, etc. Depending on the implementation, provider network 140 may include various network elements 145, such as a gateway, a support node, a serving node, a router, a switch, a bridge, as well as other network elements pertaining to various network-related functions, such as billing, security, authentication and authorization, network polices, subscriber profiles, etc. In some implementations, provider network 140 may include an Internet Protocol Multimedia Sub-system (IMS) network (not shown in FIG. 1). An IMS network may include a network for delivering IP multimedia services and may provide media flows between UE 110 and external IP networks (not shown in FIG. 1).

Although FIG. 1 shows exemplary components of environment 100, in other implementations, environment 100 may include fewer components, different components, differently arranged components, or additional functional components than depicted in FIG. 1. For example, in one implementation, environment 100 may include an MEC network that provides applications and services at the edge of a network, such as provider network 140. Additionally or alternatively, one or more components of environment 100 may perform functions described as being performed by one or more other components of environment 100.

Figure 2:
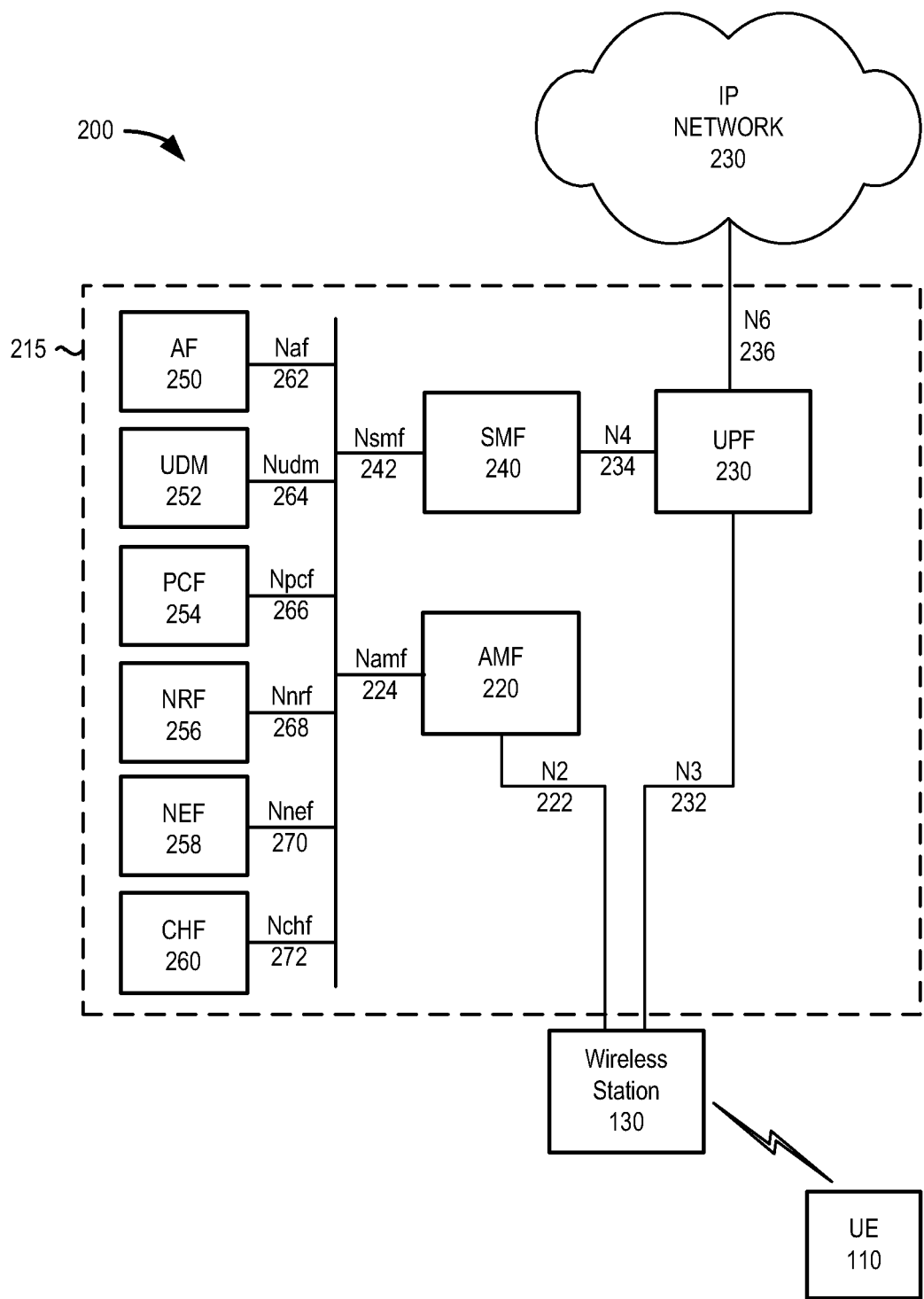
FIG. 2 is a diagram illustrating connections among devices in an exemplary portion of the network environment of FIG. 1.

FIG. 2 is a diagram illustrating a network environment 200 that includes exemplary components of environment 100 according to an implementation described herein. As shown in FIG. 2, network environment 200 may include UE 110, wireless station 130, a core network 215, and an IP network 230. Core network 215 and IP network 230 may correspond to, or be included in, provider network 140.

Core network 215 may include an Access and Mobility Management Function (AMF) 220, a User Plane Function (UPF) 230, a Session Management Function (SMF) 240, an Application Function (AF) 250, a Unified Data Management (UDM) 252, a Policy Control Function (PCF) 254, a Network Repository Function (NRF) 256, a Network Exposure Function (NEF) 258, and a Charging Function (CHF) 260. AMF 220, UPF 230, SMF 240, AF 250, UDM 252, PCF 254, NRF 256, NEF 258, and CHF 260 may correspond to network elements 145 of FIG. 1 and may each be implemented as separate network devices or as nodes shared among one or more network devices. While FIG. 2 depicts a single AMF 220, UPF 230, SMF 240, AF 250, UDM 252, PCF 254, NRF 256, NEF 258, and CHF 260 for illustration purposes, in practice, FIG. 2 may include multiple wireless stations 130, AMFs 220, UPFs 230, SMFs 240, AFs 250, UDMs 252, PCFs 254, NRFs 256, NEFs 258, and/or CHFs 260.

Wireless station 130 may include one or more devices and other components and functionality that enable UE 110 to wirelessly connect to access network 120 using 5G Radio Access Technology (RAT). Wireless station 130 may include, for example, a gNodeB (gNB) with a wireless transceiver with an antenna array configured for mm-wave wireless communication. In other implementation, wireless station 130 may include another type of base station. Wireless station 130 may communicate with AMF 220 using an N2 interface 222 and communicate with UPF using an N3 interface 232. According to implementations described herein, wireless station 130 may receive and store network slice data which may be used for applying intelligent admission control during an initial attachment process for UE device 110.

AMF 220 may perform registration management, connection management, reachability management, mobility management, lawful intercepts, Short Message Service (SMS) transport between UE 110 and an SMS function (not shown in FIG. 2), session management messages transport between UE 110 and SMF 240, access authentication and authorization, location services management, functionality to support non-3GPP access networks, and/or other types of management processes. AMF 220 may be accessible by other function nodes via a Namf interface 224.

UPF 230 may maintain an anchor point for intra/inter-RAT mobility, maintain an external Packet Data Unit (PDU) point of interconnect to a data network (e.g., IP network 230, etc.), perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, send and forward an "end marker" to a Radio Access Network (RAN) node (e.g., wireless station 130), and/or perform other types of user plane processes. UPF 230 may communicate with SMF 240 using an N4 interface 234 and connect to IP network 230 using an N6 interface 236.

SMF 240 may perform session establishment, modification, and/or release, perform IP address allocation and management, perform Dynamic Host Configuration Protocol (DHCP) functions, perform selection and control of UPF 230, configure traffic steering at UPF 230 to guide traffic to the correct destination, terminate interfaces toward PCF 254, perform lawful intercepts, charge data collection, support charging interfaces, control and coordinate charging data collection, termination of session management parts of Non-Access Stratum (NAS) messages, perform downlink data notification, manage roaming functionality, and/or perform other types of control plane processes for managing user plane data. SMF 240 may report data usage information to CHF 260 when the UE 110 is accessing applications or services that use online or offline charging. SMF 240 may be accessible via an Nsmf interface 242.

AF 250 may provide services associated with a particular application, such as, for example, application influence on traffic routing, accessing NEF 258, interacting with a policy framework for policy control, and/or other types of applications. AF 250 may be accessible via an Naf interface 262.

UDM 252 may maintain subscription information for UEs 110, manage subscriptions, generate authentication credentials, handle user identification, perform access authorization based on subscription data, perform network function registration management, maintain service and/or session continuity by maintaining assignment of SMF 240 for ongoing sessions, support SMS delivery, support lawful intercept functionality, and/or perform other processes associated with managing user data. UDM 252 may be accessible via a Nudm interface 264.

PCF 254 may support policies to control network behavior, provide policy rules to control plane functions (e.g., to SMF 240), access subscription information relevant to policy decisions, perform policy decisions, and/or perform other types of processes associated with policy enforcement. PCF 254 may be accessible via Npcf interface 266.

NRF 256 may support a service discovery function and maintain a profile of available network function (NF) instances and their supported services. An NF profile may include an NF instance identifier (ID), an NF type, a Public Land Mobile Network identifier (PLMN-ID) associated with the NF, a network slice ID associated with the NF, capacity information for the NF, service authorization information for the NF, supported services associated with the NF, endpoint information for each supported service associated with the NF, and/or other types of NF information. NRF 256 may be accessible via an Nnrf interface 268.

NEF 258 may expose capabilities and events to other NFs, including third-party NFs, AFs, edge computing NFs, and/or other types of NFs. Furthermore, NEF 258 may secure provisioning of information from external applications to access network 120, translate information between access network 120 and devices/networks external to access network 120, support a Packet Flow Description (PFD) function, and/or perform other types of network exposure functions. NEF 258 may be accessible via Nnef interface 270.

CHF 260 may provide an interface to a CCS. CHF 260 may include the interface between the CCS and the provider network 140. CHF 260 may provide spending limits and quotas for services to SMF 240 and may collect usage information from SMF 240 for online and offline services. CHF 260 may be accessible via Nchf interface 272.

Although FIG. 2 shows exemplary components of core network 215, in other implementations, core network 215 may include fewer components, different components, differently arranged components, or additional components than depicted in FIG. 2. Additionally or alternatively, one or more components of core network 215 may perform functions described as being performed by one or more other components of core network 215. For example, core network 215 may include additional function nodes not shown in FIG. 2, such as an Authentication Server Function (AUSF), a Non-3GPP Interworking Function (N3IWF), a Unified Data Repository (UDR), an Unstructured Data Storage Network Function (UDSF), a 5G Equipment Identity Register (5G-EIR) function, a Location Management Function (LMF), a Security Edge Protection Proxy (SEPP) function, a Network Slice Selection Function (NSSF) and/or other types of functions. Furthermore, while particular interfaces have been described with respect to particular function nodes in FIG. 2, additionally or alternatively, core network 215 may include a reference point architecture that includes point-to-point interfaces between particular function nodes.

Figure 3:
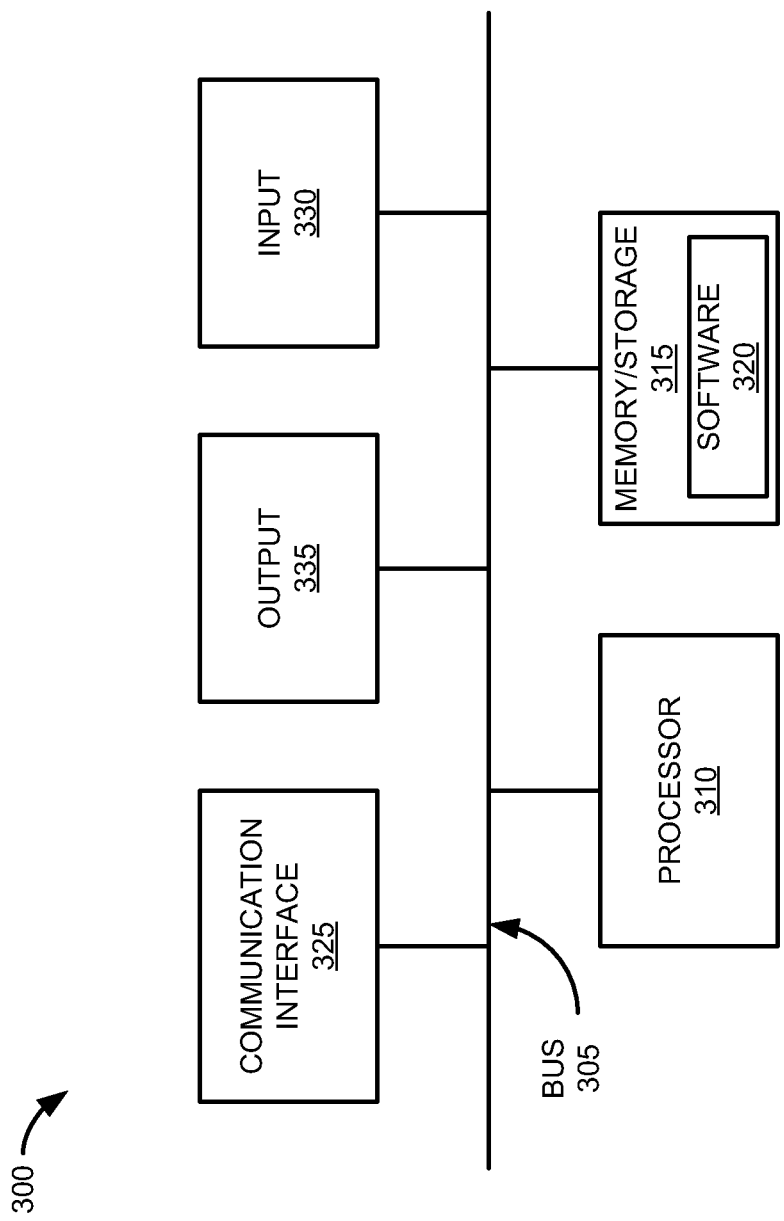
FIG. 3 is a diagram of exemplary components that may be included in one or more of the devices shown in FIGS. 1 and 2.

FIG. 3 is a diagram illustrating exemplary components of a device 300 that may correspond to one or more of the devices described herein. For example, device 300 may correspond to components included in UE 110, wireless station 130, network elements 145, AMF 220, UPF 230, SMF 240, AF 250, UDM 252, PCF 254, NRF 256, NEF 258, CHF 260, and/or other components of access network 120 and/or provider network 140. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, 5G UE 110 may include logic to perform tasks, as described herein, based on software 320.

Communication interface 325 permits device 300 to communicate with other devices, networks, systems, devices, and/or the like. Communication interface 325 includes one or multiple radio frequency (RF) wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
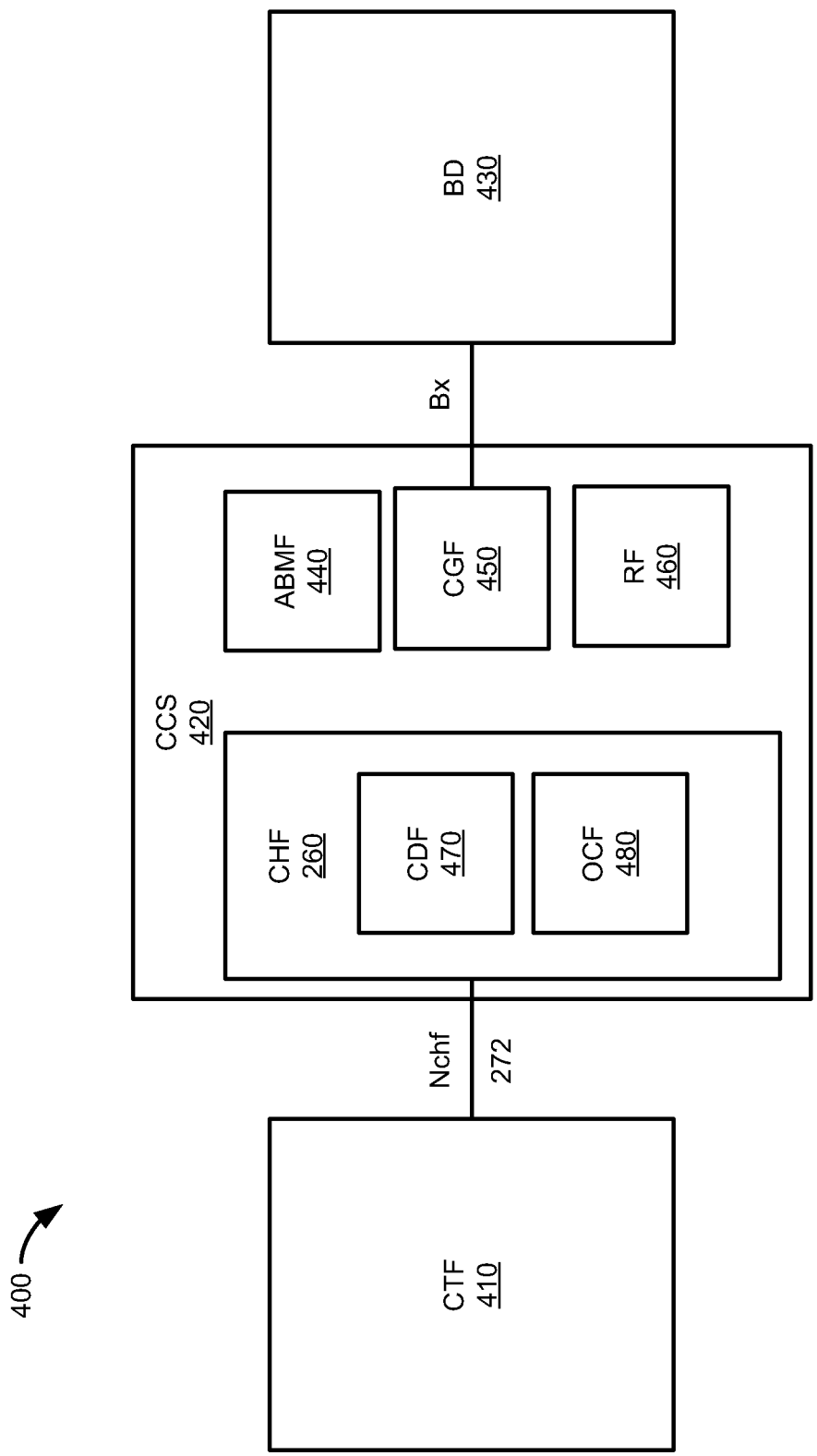
FIG. 4 is a block diagram of exemplary components of a system that may correspond to a portion of the network environment of FIG. 1 and/or FIG. 2.

FIG. 4 is a diagram illustrating an exemplary environment 400 that may correspond to a portion of environment 100 or environment 200. Environment 400 may include Charging Trigger Function (CTF) 410, CCS 420, and Billing Domain (BD) 430.

CTF 410 may monitor a user's service usage and may generate charging events based on the usage. CTF 410 may send the charging events to CCS 420 over Nchf interface 272. CCS 420 may include CHF 260, Account Balance Management Function (ABMF) 440, Charging Gateway Function (CGF) 450, and Rating Function (RF) 460. CHF 260 may include Charging Data Function (CDF) 470, which monitors offline charging data, and Online Charging Function (OCF) 480, which monitors online charging data. CDF 470 and OCF 480 may generate charging data records (CDRs) based on usage events received from CTF 410.

ABMF 440 may store and update a data quota for a user's account. For example, based on a subscription level that a customer has purchased, the customer may be allotted a particular amount of data for use during a particular billing cycle (e.g., per month, per week, per two weeks, etc.). ABMF 440 may keep track of the data that has been used by the user and the amount of data remaining during the billing cycle. CGF 450 may store CDRs and perform error checking and preprocessing on the CDRs. CGF 450 may additionally collect CDRs from more than one CDF 470 and/or OCF 480 and transmit the collected CDRs to BD 430 over a Bx interface. RF 460 may determine the cost of service usage according to a tariff defined by a network operator.

BD 430 may correspond to a network element 145. BD 430 may process the CDRs received from CGF 450 to create a final output. For example, BD 430 may create invoices for customers. As another example, BD 430 may process the CDRs for statistical purposes.

Figure 5:
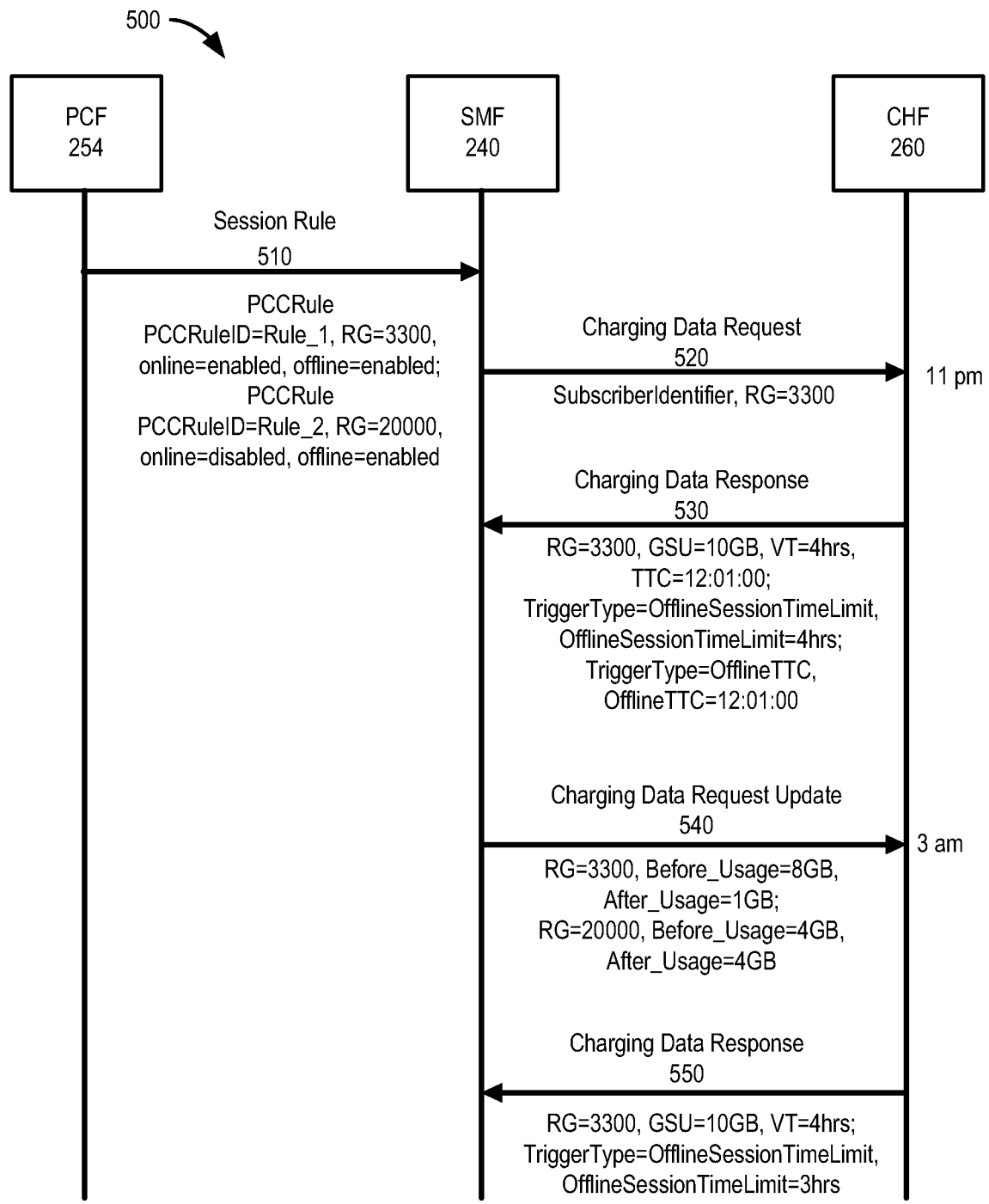
FIG. 5 is a signal flow diagram illustrating exemplary communications for determining data usage using a converged charging system, according to an implementation described herein.

FIG. 5 is a diagram illustrating exemplary communications for providing charging function in CCS 420. Network portion 500 may include PCF 254, SMF 240, and CHF 260. Communications shown in FIG. 5 provide simplified illustrations of communications in network portion 500 and are not intended to reflect every signal or communication exchanged between devices. Furthermore, additional information not described herein may be communicated with some signals or communications.

As shown in FIG. 5, at signal 510, PCF 254 may send a message to SMF 240 including a session rule for a user session. The session rule may include multiple policy and charging control (PCC) rules. As shown in FIG. 5, and merely as an example, the first PCC rule, which is called Rule_1, has a rating group (RG) of 3300. Each service is identified by a rating group. The PCC rule indicates that for RG 3300, online=enabled and offline=enabled. Therefore, in this example, RG 3300 is an online rating group. In this example, the second PCC rule, Rule_2, has a RG of 20000. As shown in the example, for RG=20000, online=disabled and offline=enabled. Therefore, RG 20000 is an offline rating group.

SMF 240 may receive the session rule from PCF 254 and, at signal 520, SMF 240 may send a charging data request associated with the session rule to CHF 260. The charging data request may indicate that there is a new session setup. In the particular example described with respect to FIG. 5, the charging data request is transmitted from SMF 240 to CHF 260 at 11:00 pm. In addition, in the example given in FIG. 5, the new billing cycle for the customer begins at 12:01 am. Therefore, the charging data request is transmitted one hour and one minute prior to the start of the new billing cycle. As shown in FIG. 5, the charging data request may include a subscriber identifier and an indication that RG=3300. The charging data request does not include information associated with the offline rating group (RG=20000) since offline rating groups do not require quota management according to Nchf specifications.

In response to receiving the charging data request, CHF 260 may send SMF 240 a charging data response in signal 530. The charging data response may include several parameters associated with the user and the rating group. As shown in the example of FIG. 5, the response may include an indication that, for rating group 3300, the granted service unit (GSU) is 10 gigabytes (GB). The GSU indicates the amount of data that the user is authorized to use for a particular rating group based on a user's preferences. Therefore, since the example shown in FIG. 5 indicates that GSU=10 GB, the user is authorized to use 10 GB for a particular billing/time period for rating group 3300 based on the user's preferences.

In the example given in FIG. 5, the charging data response additionally indicates that the validity time (VT) is set to 4 hours. The VT indicates a time period in which SMF 240 should report the user's data usage to CHF 260 if the user does not consume all of the data prior to the end of the time period. In this example, since VT=4 hrs, CHF 260 is indicating to SMF 240 that SMF 240 is to report the user's data usage with respect to rating group 3300 to SMF 250 in four hours unless the user consumes the 10 GB of data allotted to the user prior to the end of the four hours. If the user consumes all of the 10 GB of data, SMF 240 reports the user's usage to CHF 260 when the 10 GB of data is consumed.

Since, as described above, the example in FIG. 5 is taking place shortly before the end of the current billing cycle and the start of the next billing cycle, the charging data response additionally includes an indication that the tariff time change (TTC) is 12:01:00. The TTC indicates a time at which the new billing cycle begins. The TTC is included in the response only when the response is sent within a few hours (e.g., two hours, three hours, four hours, or any other preconfigured response time) prior to the beginning of the new billing cycle. The TTC may identify the time at which SMF 240 is to start counting data usage in a counter associated with the new billing cycle. Since the TTC parameter is included in the charging data response, SMF 240 is being instructed to count all data used prior to 12:01:00 in a counter associated with the current billing cycle and count all data used at or after 12:01:00 in a counter associated with the next billing cycle.

Therefore, based on the parameters included in the charging data response in the example in FIG. 5, SMF 240 is instructed to report the user's data usage associated with rating group 3300 to CHF 260 in four hours (i.e., at 3:00 am) or when 10 GB of data has been consumed by the user. In addition, the data consumed prior to 12:01:00 should be reported separately than data consumed after 12:01:00.

In previous converged charging systems, since the offline rating group information was not included in the charging data request sent from SMF 240 to CHF 260, CHF 260 was unaware that the user was using an offline service. In addition, CHF 260 was unable to notify SMF 240 to report offline usage to CHF 260 at a particular time or to reset the billing cycle time for offline rating groups. However, a new data structure may be introduced into the new charging interface so that CHF 260 may send additional information to SMF 240 and SMF 240 may be able to decode the additional information and take action based on the additional information.

As shown in FIG. 5, the charging data response includes two new data structures for offline services. The new data structures may include two new triggers at the command level of Nchf interface 272 that are dedicated to controlling the behavior of an offline rating group.

The first trigger may include the Offline Session Time Limit trigger, which may define the usage reporting time for offline rating groups. The Offline Session Time Limit trigger may instruct SMF 240 that, when the Offline Session Time Limit is reached, SMF 240 is to send a message to CHF 260 reporting the usage of all offline rating groups being used by the user. As shown in the example of FIG. 5, the Offline Session Time Limit is set to four hours (OfflineSessionTimeLimit=4 hrs). Therefore, when SMF 240 receives the charging data response at 11:00 pm, SMF 240 will report data usage associated with any offline rating groups to CHF 260 at 3:00 am.

The second trigger includes the Offline TTC trigger, which may define the monitoring time for offline rating groups and indicate a time when a new billing cycle begins for the user. When the Offline TTC trigger is reached, SMF 240 may stop counting a user's data usage for a current billing cycle and may start counting the user's data usage for the next billing cycle. Similar to the TTC parameter described above, the Offline TTC trigger may be included in the charging data response only when the charging data response is sent to SMF 240 shortly before the start of a new billing cycle (e.g., two hours, three hours, four hours, etc.).

In one implementation, the Offline TTC trigger may be an optional parameter that may or may not be included in the charging data response. If the Offline TTC trigger is included in the charging data response, SMF 240 may set an Offline-Tariff-Time-Change trigger to separate the counters at the time indicated by the Offline-TTC parameter (i.e., the time of the start of the new billing cycle). If the Offline TTC trigger is not included in the response, SMF 240 will not set a trigger to separate the counters into data usage before and after the start of the new billing cycle, and all data usage will be reported in one bucket at the next reporting time indicated by the Offline Session Time Limit.

Continuing with FIG. 5, in signal 540, SMF 240 may send a charging data request update to CHF 260 reporting the user's data usage. As shown in FIG. 5, for rating group 3300 (RG=3300), the user consumed 8 GB of data prior to the start of the new billing cycle at 12:01:00 (Before Usage=8 GB) and 1 GB of data after the start of the new billing cycle (After Usage=1 GB). In addition, the charging data request update indicates that the user was utilizing an offline charging service, rating group 20000 (RG=20000). For rating group 20000, the user consumed 4 GB of data prior to the start of the new billing cycle (Before Usage=4 GB) and 4 GB of data after the start of the new billing cycle (After Usage=4 GB). Since both the VT and Offline Session Time Limit were set to 4 hours and the user consumed less than the maximum of 10 GB for online rating group 3300, SMF 240 transmits the charging data request update to CHF 260 at 3:00 am, which is 4 hours after the charging data request was transmitted from CHF 260 to SMF 240.

In signal 550, CHF 260 may send SMF 240 a charging data response that indicates that, for rating group 3300 (RG=3300), the user is authorized to use 10 GB of data (GSU=10 GB) and SMF 240 is to report the user's data usage to CHF 260 in four hours (VT=4 hrs), unless the user consumes 10 GB of data before four hours have elapsed. Because the time is not near the start of a new billing cycle, the charging data response may not include the TTC parameter indicating the start time of the new billing cycle. The charging data response may additionally include a new trigger for the offline rating groups. As shown in FIG. 5, the charging data response may include an indication that SMF 240 should report any data usage for offline charging services in three hours (OfflineSessionTimeLimit=3 hrs). Since the start of a new billing cycle is more than a few hours away, the charging data response may not include the Offline TTC trigger.

By including the new triggers in Nchf interface 272, CHF 260 may be able to better control when and how data is reported to CHF 260 by SMF 240. For example, instead of reporting times being based on local configurations associated with SMF 240, CHF 260 may be able to control when the data is reported by using the Offline Session Time Limit trigger. Additionally, instead of receiving a single counter of data that includes data usage both before and after the start of a new billing cycle, CHF 260 may be able to indicate a time of a new billing cycle and receive separate data counts for offline data charges by using the Offline TTC trigger.

Figure 6:
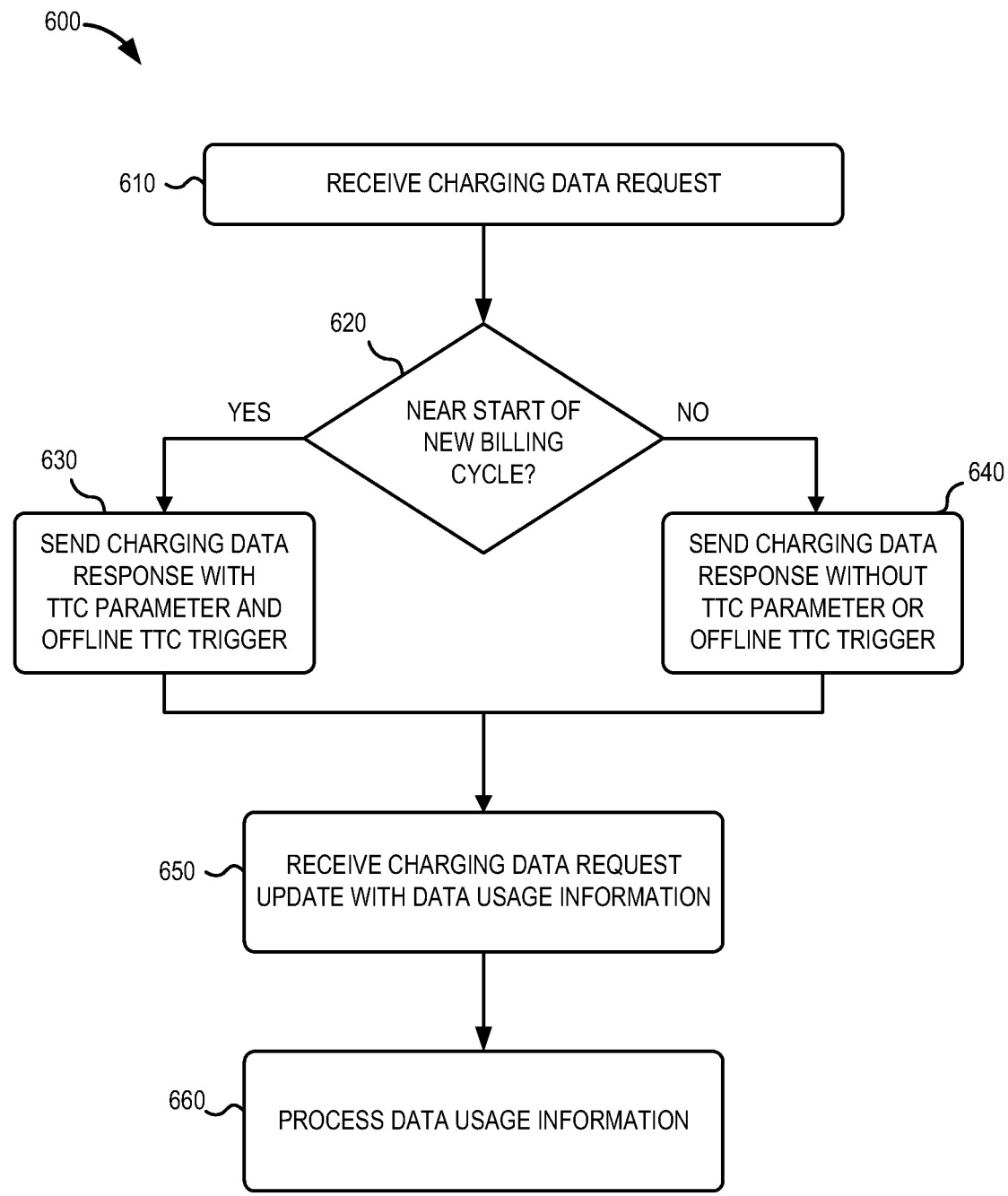
FIG. 6 is a flow diagram illustrating an exemplary process for determining data usage using a converged charging system, according to an implementation described herein.

FIG. 6 is a flow diagram illustrating an exemplary process 600 for charging for offline and online charging services in a converged charging system. In one implementation, process 600 may be implemented by CHF 260 in connection with SMF 240 and one or more other devices in network environment 100.

Referring to FIG. 6, process 600 may include receiving, at CHF 260, a charging data request from SMF 240 (block 610). For example, according to one implementation, CHF 260 may receive a charging data request indicating that a new user session is being set up. The charging data request may include an identifier associated with the user and a rating group associated with an online charging service being used by the user.

CHF 260 may determine whether the user is near the start of a new billing cycle (block 620). A user may start a new billing cycle at a regulated time during a preset time period. For example, the new billing cycle may start every month at 12:01 in the morning on the first day of the month, on the 15$^{th}$ day of the month, etc. CHF 260 may determine whether the current time is within a predetermined time period (e.g., two hours, three hours, four hours, etc.) from the start of the new billing cycle.

If the time is within the predetermined time period from the start of the new billing cycle (block 620—YES), CHF 260 may send a charging data response that includes a TTC parameter and an offline TTC trigger (block 630). The TTC parameter may indicate the time of the start of the new billing cycle so the online rating group data consumed before the new billing cycle will be counted in the current billing cycle and the online rating group data consumed after the start of the new billing cycle will be counted in the new billing cycle. The offline TTC trigger may indicate the time of the start of the new billing cycle so that any offline service data consumed prior to the start of the new billing cycle will be counted for the current billing cycle and any offline service data consumed after the start of the new billing cycle will be counted for the new billing cycle.

For the online rating group, the charging data response may additionally include a GSU parameter that indicates a data quota for the particular user for the particular online rating group. The GSU parameter may be based on user preferences and/or a policy associated with the particular user/subscriber. The charging data response may additionally include a VT parameter indicating a time period in which SMF 240 is to report data usage for the online rating group to CHF 260 in the event that the user does not reach the data quota indicated by the GSU parameter prior to the end of the time period. The charging data response may additionally include an offline session time limit trigger than indicates a time period in which SMF 240 is to report data usage from any offline rating groups to CHF 260.

Returning to FIG. 6, if the time is not within the predetermined time period from the start of the new billing cycle (block 620—NO), CHF 260 may send a charging data response that does not include a TTC parameter or an offline TTC trigger (block 640). Since the time is not within the predetermined time period from the start of the new billing cycle, the session is unlikely to continue into the new billing cycle and the data usage does not need to be counted in two separate billing cycle counters. The charging data response may include the GSU and VT parameters for the online rating group. The charging data response may additionally include the offline session time limit trigger for any offline rating groups.

In each case (e.g., the time is not within a predetermined time of the start of a billing cycle or is within the predetermined time), processing continues with CHF 260 receiving a charging data request update including the data usage information (block 650). For example, after the time indicated in the TTC parameter, CHF 260 may receive, from SMF 240, data usage associated with the online rating group. If the charging data response included a TTC parameter, the data usage may indicate data consumed prior to the start of the new billing cycle and data consumed after the start of the new billing cycle. If the charging data response did not include a TTC parameter, the data consumed may include all data consumed during the time period.

As another example, after the time indicated in the offline session time limit trigger, CHF 260 may receive, from SMF 240, data usage associated with any offline rating groups during the time indicated in the offline session time limit trigger. If the charging data response included an optional offline TTC trigger (only included if the response was sent within a predetermined time period before the start of a new billing cycle), the data usage may indicate offline data consumed prior to the start of the new billing cycle and offline data consumed after the start of the new billing cycle. If the charging data response did not include an optional offline TTC trigger, the data consumed may include all offline data consumed during the time period.

The time indicated by the VT parameter may be the same as or different than the time indicated by the offline session time limit trigger. In one implementation, if the time indicated in the VT parameter is the same as the time indicated in the offline session time limit trigger, the charging data request update may include data usage information associated with the online rating group and any offline rating groups. As described above, the offline usage data and the online usage data may be divided into data consumed before and after the new billing cycle when the charging data response includes a TTC parameter and an offline TTC trigger.

Returning to FIG. 6, the received data usage information may be processed (block 660). For example, CHF 260 may generate CDRs based on the usage information and pass the CDRs to CGF 450. As another example, the received data usage information may be processed to determine how much data a user has left to use before the start of a new billing cycle. As another example, the received data usage information may be used to determine that a user has gone over a monthly allotment of data and actions may be taken (e.g., shut off service, slow down service, provide an option to purchase additional data, etc.). As another example, the received usage information may be used to bill the user for data used.

The foregoing description of implementations provides illustration and description, but is not intended to be exhaustive or to limit the invention to the precise form disclosed. Modifications and variations are possible in light of the above teachings or may be acquired from practice of the invention. For example, while a series of message flows have been described with respect to FIG. 5 and a series of blocks have been described with regard to FIG. 6, the order of the message/operation flows and blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
receiving, at a network device and from a session management device, a first message including a first identifier associated with a subscriber and a second identifier associated with a first service being used by the subscriber, wherein the first service is charged using an online charging system;
determining whether a period of time before a new billing cycle associated with the subscriber begins is less than a threshold period of time;
transmitting, by the network device and to the session management device, a second message indicating a first time period in which to report data usage associated with the first service and a second time period in which to report data usage associated with one or more second services, wherein the one or more second services are charged using an offline charging system, and wherein, when the period of time before the new billing cycle associated with the subscriber begins is less than the threshold period of time, transmitting the second message includes:
transmitting a time at which the new billing cycle begins for the one or more second services, and
transmitting a trigger to separate the second data usage information into data usage prior to the time at which the new billing cycle begins and data usage after the time at which the new billing cycle begins;
receiving, at the network device and from the session management device, first data usage information associated with the first service when the first time period has expired;
receiving, at the network device and from the session management device, second data usage information associated with the one or more second services when the second time period has expired; and
processing, by the network device, the first data usage information and the second data usage information.

2. The method of claim 1, wherein the trigger includes an optional trigger included in the second message when the period of time before the new billing cycle associated with the subscriber begins is less than the threshold period of time.

3. The method of claim 1, wherein, when the period of time before the new billing cycle associated with the subscriber begins is less than the threshold period of time, receiving the second data usage information associated with the one or more second services includes:
receiving second data usage information associated with data usage prior to the time at which the new billing cycle begins, and
separately receiving second data usage information associated with data usage after the time at which the new billing cycle begins.

4. The method of claim 1, wherein, when the period of time before the new billing cycle associated with the subscriber begins is not less than the threshold period of time, receiving the second data usage information associated with the one or more second services includes:
receiving a single indication of second data usage information when the second time period has expired.

5. The method of claim 1, wherein the trigger includes an Offline Tariff Time Change (TTC) trigger.

6. The method of claim 1, wherein transmitting the second message includes transmitting a second trigger to report data usage associated with the one or more second services when the second time period has expired.

7. The method of claim 6, wherein the second trigger includes an Offline Session Time Limit trigger.

8. A device comprising:
one or more memories to store instructions; and
one or more processors configured to execute the instructions to:
receive a first message, wherein the first message includes a first identifier associated with a subscriber and a second identifier associated with a first service being used by the subscriber, and wherein the first service is charged using an online charging system;
determine whether a period of time before a new billing cycle associated with the subscriber begins is less than a threshold period of time;
transmit a second message, wherein the second message indicates a first time period in which to report data usage associated with the first service and a second time period in which to report data usage associated with one or more second services, wherein the one or more second services are charged using an offline charging system, and wherein, when the period of time before the new billing cycle associated with the subscriber begins is less than the threshold period of time, when transmitting the second message, the one or more processors are further configured to execute instructions to:
transmit a time at which the new billing cycle begins for the one or more second services, and
transmit a trigger to separate the second data usage information into data usage prior to the time at which the new billing cycle begins and data usage after the time at which the new billing cycle begins;
receive first data usage information associated with the first service when the first time period has expired;
receive second data usage information associated with the one or more second services when the second time period has expired; and
process the first data usage information and the second data usage information.

9. The device of claim 8, wherein the trigger includes an optional trigger included in the second message when the period of time before the new billing cycle associated with the subscriber begins is less than the threshold period of time.

10. The device of claim 8, wherein, when the period of time before the new billing cycle associated with the subscriber begins is less than the threshold period of time, when receiving the second data usage information associated with the one or more second services, the one or more processors are further configured to:
receive second data usage information associated with data usage prior to the time at which the new billing cycle begins, and
separately receive second data usage information associated with data usage after the time at which the new billing cycle begins.

11. The device of claim 8, wherein, when the period of time before the new billing cycle associated with the subscriber begins is not less than the threshold period of time, when receiving the second data usage information associated with the one or more second services, the one or more processors are further configured to:
receive a single indication of second data usage information when the second time period has expired.

12. The device of claim 8, wherein the trigger includes an Offline Tariff Time Change (TTC) trigger.

13. The device of claim 8, wherein, when transmitting the second message, the one or more processors are further configured to transmit a second trigger to report data usage associated with the one or more second services when the second time period has expired.

14. The device of claim 13, wherein the second trigger includes an Offline Session Time Limit trigger.

15. A non-transitory computer-readable medium containing instructions executable by at least one processor, the computer-readable medium comprising one or more instructions to cause the at least one processor to:
receive a first message, wherein the first message includes a first identifier associated with a subscriber and a second identifier associated with a first service being used by the subscriber, and wherein the first service is charged using an online charging system;
determine whether a period of time before a new billing cycle associated with the subscriber begins is less than a threshold period of time;
transmit a second message, wherein the second message indicates a first time period in which to report data usage associated with the first service and a second time period in which to report data usage associated with one or more second services, wherein the one or more second services are charged using an offline charging system, and wherein, when the period of time before the new billing cycle associated with the subscriber begins is less than the threshold period of time, the one or more instructions to cause the at least one processor to transmit the second message include one or more instruction to cause the at least one processor to:
transmit a time at which the new billing cycle begins for the one or more second services, and
transmit a trigger to separate the second data usage information into data usage prior to the time at which the new billing cycle begins and data usage after the time at which the new billing cycle begins;
receive first data usage information associated with the first service when the first time period has expired;

receive second data usage information associated with the one or more second services when the second time period has expired; and process the first data usage information and the second data usage information.

16. The non-transitory computer-readable medium of claim 15, wherein the trigger includes an optional trigger included in the second message when the period of time before the new billing cycle associated with the subscriber begins is less than the threshold period of time.

17. The non-transitory computer-readable medium of claim 15, wherein, when the period of time before the new billing cycle associated with the subscriber begins is less than the threshold period of time, the instructions to cause the at least one processor to receive the second data usage information associated with the one or more second services include instructions to cause the at least one processor to:

receive second data usage information associated with data usage prior to the time at which the new billing cycle begins, and separately receive second data usage information associated with data usage after the time at which the new billing cycle begins.

18. The non-transitory computer-readable medium of claim 15, wherein the trigger includes an Offline Tariff Time Change (TTC) trigger.

19. The non-transitory computer-readable medium of claim 15, wherein the instructions to cause the at least one processor to transmit the second message include instructions to cause the at least one processor to transmit a second trigger to report data usage associated with the one or more second services when the second time period has expired.

20. The non-transitory computer-readable medium of claim 19, wherein the second trigger includes an Offline Session Time Limit trigger.

* * * * *